United States Patent
Ito (10) Patent No.: US 7,817,317 B2
(45) Date of Patent: Oct. 19, 2010

(54) IMAGE READING APPARATUS AND SHADING CORRECTION DATA GENERATING METHOD

(75) Inventor: Yohei Ito, Tokyo (JP)

(73) Assignee: Canon Denshi Kabushiki Kaisha, Chichibu-shi (JP)

(*) Notice: Subject to any disclaimer, the term of this patent is extended or adjusted under 35 U.S.C. 154(b) by 229 days.

(21) Appl. No.: 12/035,576

(22) Filed: Feb. 22, 2008

(65) Prior Publication Data

US 2008/0204820 A1    Aug. 28, 2008

(30) Foreign Application Priority Data

Feb. 28, 2007    (JP) .............. 2007-049583

(51) Int. Cl.
 H04N 1/46    (2006.01)
 G06F 15/00    (2006.01)
 G03F 3/08    (2006.01)
 G06K 9/00    (2006.01)

(52) U.S. Cl. .............. 358/516; 358/1.9; 358/520; 382/167

(58) Field of Classification Search .............. 358/1.9, 358/512, 516, 518, 520, 538, 416; 382/167, 382/318, 312
See application file for complete search history.

(56) References Cited

U.S. PATENT DOCUMENTS

| | | | | |
|---|---|---|---|---|
| 4,677,495 A | 6/1987 | Ito et al. | .............. | 358/285 |
| 4,823,195 A | 4/1989 | Ito | .............. | 358/285 |
| 4,922,335 A * | 5/1990 | Outa et al. | .............. | 358/506 |
| 4,969,053 A * | 11/1990 | Outa et al. | .............. | 348/104 |
| 5,032,712 A | 7/1991 | Ito | .............. | 250/208.1 |
| 5,125,047 A | 6/1992 | Ito et al. | .............. | 382/65 |
| 5,151,796 A | 9/1992 | Ito et al. | .............. | 358/461 |
| 6,122,412 A * | 9/2000 | Noguchi et al. | .............. | 382/312 |
| 6,313,477 B1 * | 11/2001 | Yasuda et al. | .............. | 250/587 |
| 6,438,271 B1 | 8/2002 | Usami et al. | .............. | 382/274 |
| 6,920,251 B2 * | 7/2005 | Toriyama | .............. | 382/274 |
| 7,545,536 B2 * | 6/2009 | Hayashi | .............. | 358/1.9 |
| 2008/0198426 A1 * | 8/2008 | Yokochi | .............. | 358/486 |

FOREIGN PATENT DOCUMENTS

JP    2006-072838    3/2006

* cited by examiner

Primary Examiner—Madeleine A Nguyen
(74) Attorney, Agent, or Firm—Fitzpatrick, Cella, Harper & Scinto

(57) ABSTRACT

An image reading apparatus capable of generating accurate shading correction data while removing noise. A shading reference plate is arranged at a location having different optical distance between the location and an image sensor in an image reading unit from optical distance between original reading position and said image sensor. The shading reference plate is read by the image reading unit whereby secondary reference data is acquired, and a reference sheet is read which is put on a position substantially identical to the original reading position whereby primary reference data is acquired. Primary and secondary correction data is generated based on the primary and secondary reference data, and correction coefficient data is generated based on the primary and secondary correction data. Shading correction data is generated based on read data of the shading reference plate and the correction coefficient data. The shading correction of the images of original read by the image reading unit is performed based on the shading correction data.

12 Claims, 7 Drawing Sheets

FIG. 6A masksize=3

| 1 | 1 | 1 |

$$P'(n) = \frac{P(n-1)+P(n)+P(n+1)}{3}$$

FIG. 6B masksize=9

| 1 | 1 | 1 | 1 | 1 | 1 | 1 | 1 | 1 |

$$P'(n) = \frac{P(n-4)+P(n-3)+\cdots+P(n+4)}{9}$$

IMAGE READING APPARATUS AND SHADING CORRECTION DATA GENERATING METHOD

BACKGROUND OF THE INVENTION

1. Field of the Invention

The present invention relates to an image reading apparatus which reads an image formed on an original while conveying the original and a shading correction data generating method applied to the image reading apparatus.

2. Description of the Related Art

Conventionally, when reading an image of an original in an image reading apparatus or the like, the shading correction has been conducted to correct the variation in sensitivity of light receiving elements of the line image sensor or to correct the unevenness of the applied light intensity resulted from the directivity of light source or the like.

During the shading correction, when the shading correction is executed using shading correction data acquired by a line image sensor reading a white reference plate for shading correction arranged at farther/closer position than the original reading position (in-focus position), the shading correction data needs to be converted into ideal shading correction data which must be acquired by reading the white reference plate for shading correction arranged at the same position as the original reading position. This conversion is carried out by multiplying the shading correction data by light intensity distribution correction coefficients acquired in advance.

One example of the method of generating the light intensity distribution correction coefficients includes the following. A reference sheet made of materials having equivalent whiteness to the white reference plate for shading correction is arranged in advance at the position approximately equal to the original reading position (in-focus position). The white reference plate for shading correction and the reference sheet are read using the line image sensor. The read data of the white reference plate and the read data of the reference sheet are sampled, and the light intensity distribution correction coefficients expressed by the differences calculated from comparison of two read data are obtained (for example, see Japanese Laid-Open Patent Publication (Kokai) No. 2006-072838).

However, the read data of the white reference plate for shading correction and the read data of the reference sheet read by the line image sensor contain noise resulted from the variation in sensitivity of light receiving elements, or noise caused by stain or the fracture of the reference plate or the reference sheet that causes fluctuation of the received light intensity of light receiving element. Therefore, the light intensity distribution correction coefficients calculated from the differences obtained from comparison of the read data of the white reference plate for shading correction and the read data of the reference sheet contain noise having large margin of errors. Furthermore, depending on the construction of the light source, the light intensity distribution correction coefficients vary depending on the positions of the light receiving elements of the line image sensor, due to the directivity of the light beam emitted by the light source. For example, in the case of arranging LED at the end of the line image sensor in the longitudinal direction and guiding the light emitted by the LED to the entire reading positions of the line image sensor using a light guide member, the light intensity distribution correction coefficients significantly vary depending on the positions of the light receiving elements of the line image sensor.

Figure 9:
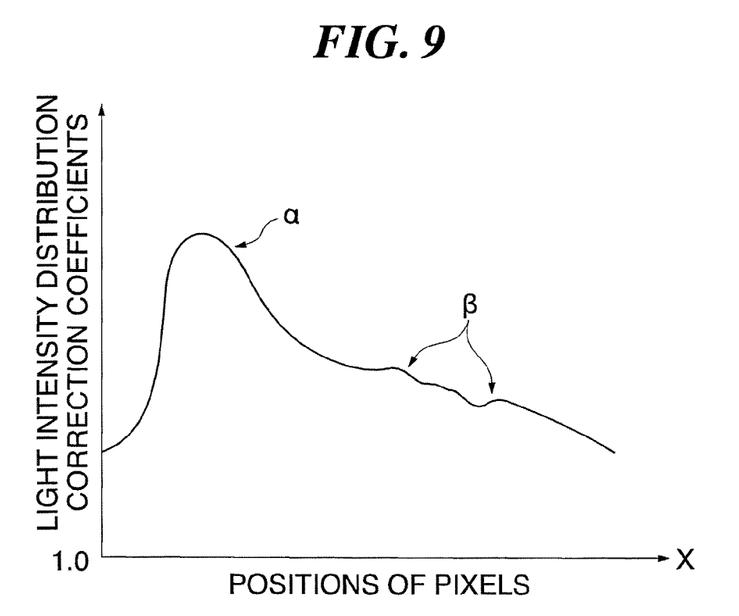
FIG. 9 is a view showing the light intensity distribution correction coefficients generated for the line image sensor by a conventional method.

FIG. 9 is a view showing one example of light intensity distribution correction coefficients when a white reference plate for shading correction is arranged at a position farther than the original reading position (in-focus position) opposing the line image sensor. And, also the light intensity distribution correction coefficients are obtained from ratio of two read data described above. As shown in FIG. 9, part of the coefficients are particularly high in the pixels corresponding to the light receiving elements near the end of the line image sensor (α section in FIG. 9), because there is a difference between the position of the white reference plate for shading correction and the position of the reference sheet. This characteristic called unevenness caused by directivity is particularly evident when the LED is arranged at the end of the line image sensor in the longitudinal direction to guide, using the light guide member, the light emitted by the LED to the entire reading positions of the line image sensor. The unevenness caused by directivity is not significantly evident in the read data at the point of acquiring the read data of the white reference plate for shading correction and the read data of the reference sheet. However, the unevenness caused by directivity becomes evident in the data of the light intensity distribution correction coefficients calculated using the ratios of the read data of the white reference plate for shading correction to the read data of the reference sheet. Meanwhile, when strong filtering is performed to remove the undesired noise that is contained in the light intensity distribution correction coefficients and that causes large errors, the peak indicative of the uneven directivity required in the shading correction is lost from the data of the light intensity distribution correction coefficients, which makes it impossible to perform the accurate shading.

Even with an assumption that the line image sensor is an ideal one which does not cause any variation in sensitivity of light receiving element, the light intensity distribution correction coefficients contain noise caused by stain on a contact glass, stain on the reference plate, or the like (for example, β section in FIG. 9). In order to remove such noise, low-pass filtering with a narrow passband needs to be performed using a noise filter having a relatively large mask width (mask size). However, as in the case mentioned above, the unevenness caused by directivity required in the shading correction is also removed when a noise filter having a large mask width is used.

SUMMARY OF THE INVENTION

The present invention provides an image reading apparatus which is capable of generating accurate shading correction data while removing noise and a shading correction data generating method applied to the image reading apparatus.

In a first aspect of the present invention, there is provided An image reading apparatus comprising an image reading unit including a light source for illuminating an original and an image sensor adapted to read images of the original at a predetermined original reading position, a reference member arranged at a location having different optical distance between the location and said image sensor from optical distance between original reading position and said image sensor, a reference data acquiring unit adapted to acquire secondary reference data based on a data read from said reference member by said image reading unit, and adapted to acquire primary reference data based on a data read from another reference member put on the original reading position or a position substantially identical to the original reading position by said image reading unit, a correction data generating unit adapted to generate primary correction data and secondary correction data based on the primary and secondary reference data, a correction coefficient data generating unit adapted to generate correction coefficient data based on the primary and secondary correction data, a shading correction data generating unit adapted to generate shading correction data based on read data of said reference member and the correction coefficient data, and a shading correction unit adapted to correct a shading of the images of the original read by said image reading unit based on the shading correction data generated by said shading correction data generating unit.

In a second aspect of the present invention, there is provided a shading correction data generating method of generating shading correction data used for shading correction of images of an original read by an image reading unit including a light source for illuminating the original and an image sensor adapted to read the images of the original at a predetermined original reading position, the shading correction data generating method comprising a secondary reference data acquiring step of acquiring secondary reference data based on a data read by the image reading unit reading a reference member arranged at a location having different optical distance between the location and the image sensor from optical distance between original reading position and said image sensor, a primary reference data acquiring step of acquiring primary reference data based on a data read by the image reading unit reading another reference member when the another reference member is put on the original reading position or a position substantially identical to the original reading position, a correction data generating step of generating primary correction data and secondary correction data based on the primary and secondary reference data, a correction coefficient data generating step of generating correction coefficient data based on the primary and secondary correction data, and a shading correction data generating step of generating shading correction data based on read data of the reference member and the correction coefficient data.

According to the present invention, read data of a reference sheet and read data of a shading reference plate read by an image reading unit are acquired as primary reference data and secondary reference data, primary correction data and secondary correction data are generated based on the primary and secondary reference data, and correction coefficient data is generated based on the primary and secondary correction data. Furthermore, shading correction data is generated based on read data in which a reference member is read immediately before the image reading and the correction coefficient data, and the shading of an image of original read by the image reading unit is corrected based on the generated shading correction data. This enables to remove the noise caused by stain on the contact glass, stain on the reference member, or the like and prevent the removal of the unevenness caused by directivity required in the shading correction, to thereby make it possible to generate accurate shading correction data while removing the noise.

Further features and advantages of the present invention will become apparent from the following detailed description of exemplary embodiments with reference to the attached drawings.

DETAILED DESCRIPTION OF THE PREFERRED EMBODIMENTS

The present invention will now be described in detail with reference to the drawings showing a preferred embodiment thereof.

Figure 1:
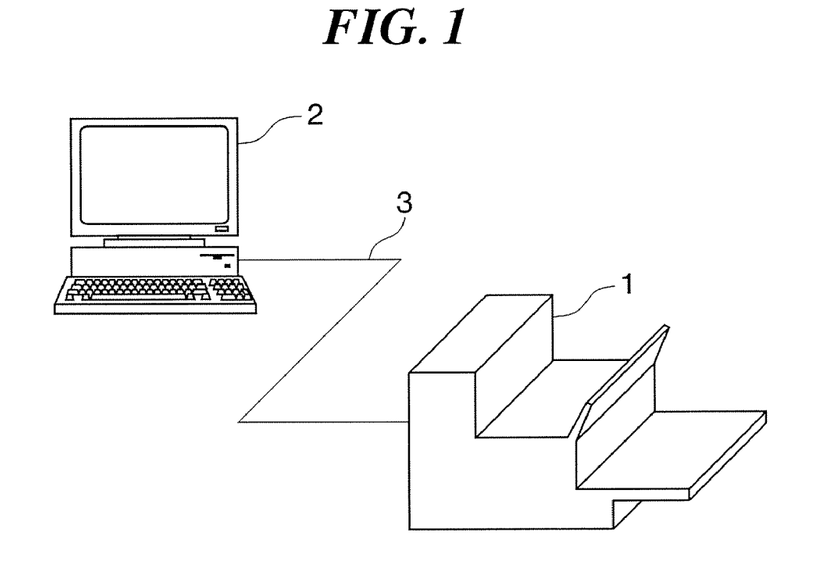
FIG. 1 is a view schematically showing the arrangement of an image reading system having an image reading apparatus according to an embodiment of the present invention.

FIG. 1 is a view schematically showing the arrangement of an image reading system including an image reading apparatus according to an embodiment of the present invention.

In FIG. 1, the image reading system is comprised of an image reading apparatus 1 and a host computer 2 connected to the image reading apparatus 1 via a communication cable 3. The image reading apparatus 1 receives a control command from the host computer 2 via the communication cable 3 to perform operations. A general-purpose communication protocol is used for communication between the image reading apparatus 1 and the host computer 2. A general-purpose OS (operation system), a driver, an application, and the like are operated on the host computer 2. At the same time, in the image reading apparatus 1 software runs on a general-purpose OS which is operated on a CPU 201 described below.

Figure 2:
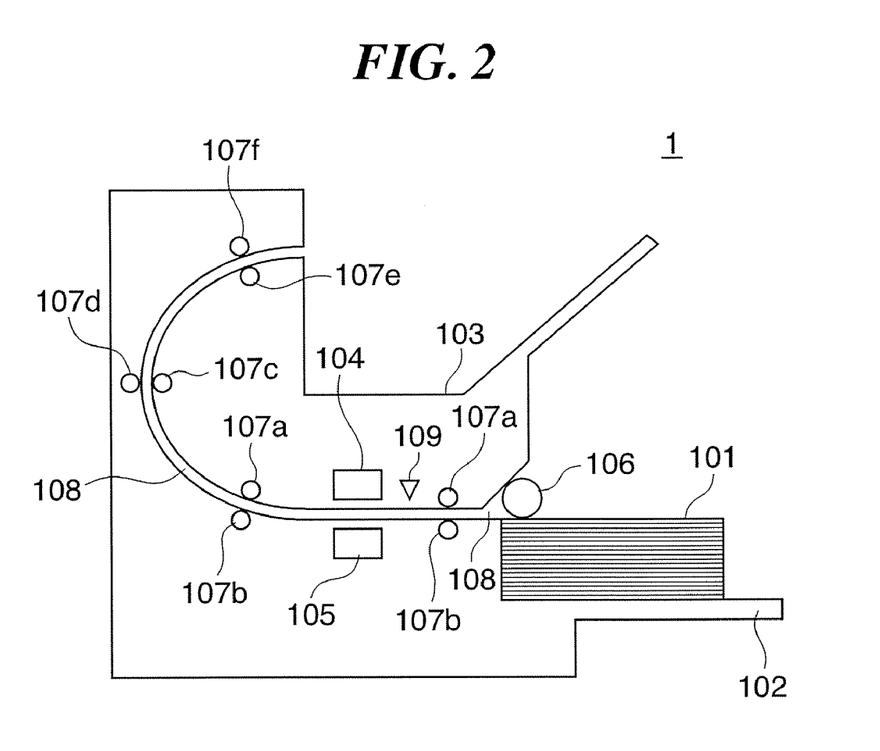
FIG. 2 is a cross-sectional view schematically showing the arrangement of the image reading apparatus in FIG. 1.

FIG. 2 is a cross-sectional view schematically showing the arrangement of the image reading apparatus 1 in FIG. 1.

In FIG. 2, the image reading apparatus 1 is comprised of an original mounting table 102 on which an original 101 is mounted, a feed roller 106 that is driven by a feed motor, not shown, to feed an original to a conveying path 108, convey roller pairs 107a and 107b that are driven by a convey motor (not shown) to convey an original, and a registration sensor 109 that detects an original moving in the conveying path 108. The image reading apparatus 1 is further comprised of an image reading unit 104 that reads an image on one side of the fed original or the like, an image reading unit 105 that reads an image on the other side of the fed original or the like, convey rollers 107c to 107f that are driven by a convey motor to convey an original, and a discharge tray 103 that is arranged outside the exit of the conveying path 108 and on which an original is discharged.

Figure 3:
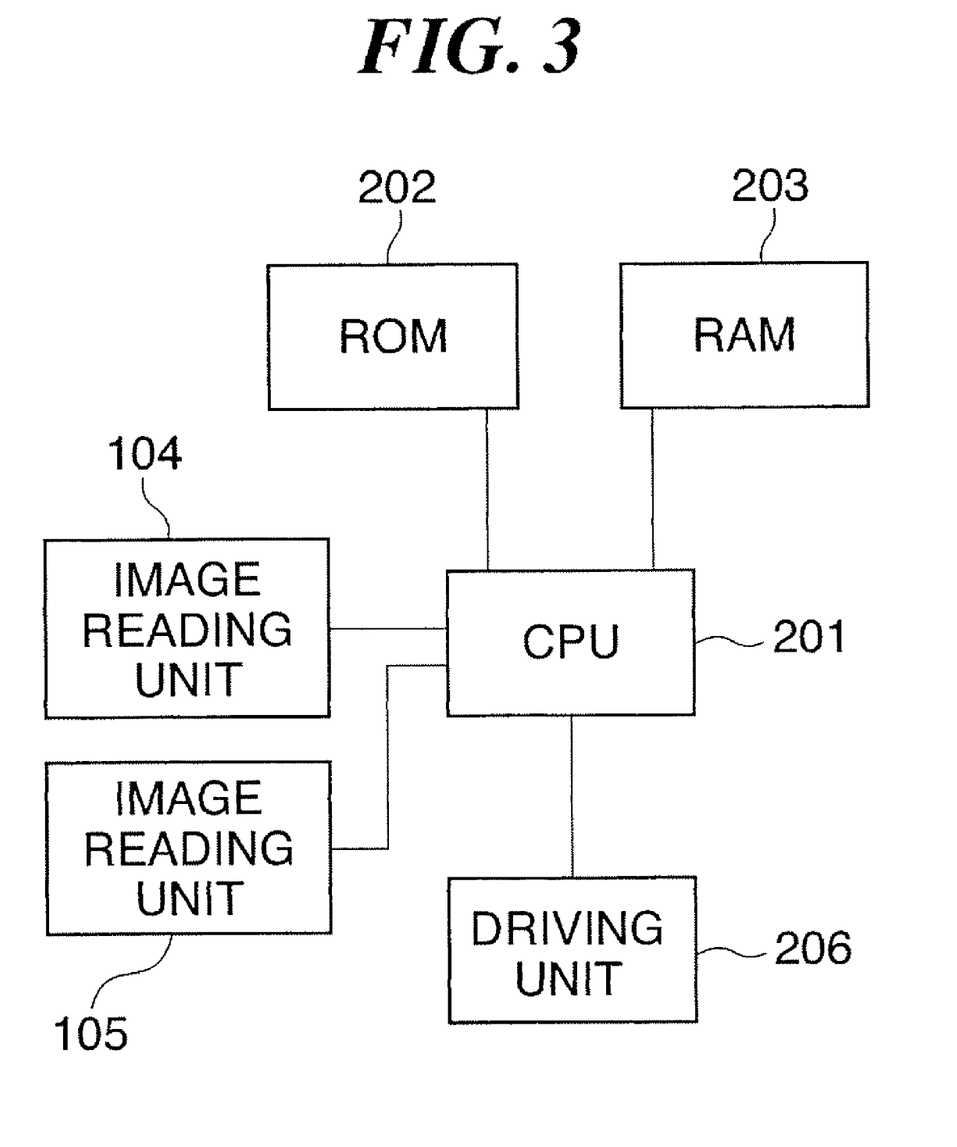
FIG. 3 is a block diagram schematically showing the arrangement of the image reading apparatus of FIG. 2.

FIG. 3 is a block diagram schematically showing the arrangement of the image reading apparatus 1 of FIG. 2.

In FIG. 3, the CPU 201 executes various processes described below in accordance with programs stored in a ROM 202 described below and controls the entire image reading apparatus 1. A RAM 203 is used as a work area of the CPU 201 or as a temporary storage of image data or the like read out by the image reading units 104 and 105. The ROM 202 stores programs for executing various processes described below, fixed data, and the like. A driving unit 206 drives a feed motor and a convey motor, not shown, in accordance with an output signal from the CPU 101. The image reading units 104 and 105 read images on one side of the conveyed original and the other side thereof in accordance with output signals from the CPU 201.

When a scan command is transmitted from the host computer 2 to the image reading apparatus 1, the convey roller pairs 107a and 107b driven by the convey motor rotate in the image reading apparatus 1. As the feed roller 106 driven by the feed motor rotates, the originals 101 mounted on the original mounting table 102 are transferred to the conveying path 108 one by one. The originals transferred to the conveying path 108 are moved by the convey rollers 107a to 107f through the conveying path 108 and discharged to the discharge tray 103. When detecting that the originals have passed through the registration sensor 109, the image reading units 104 and 105 read the images formed on one side of each of the originals and the other side thereof.

The image reading apparatus 1 generates shading correction data before feeding the originals 101 to the conveying path 108. The shading correction data generating process executed before the original feeding operation will now be described with reference to FIG. 4.

Figure 4:
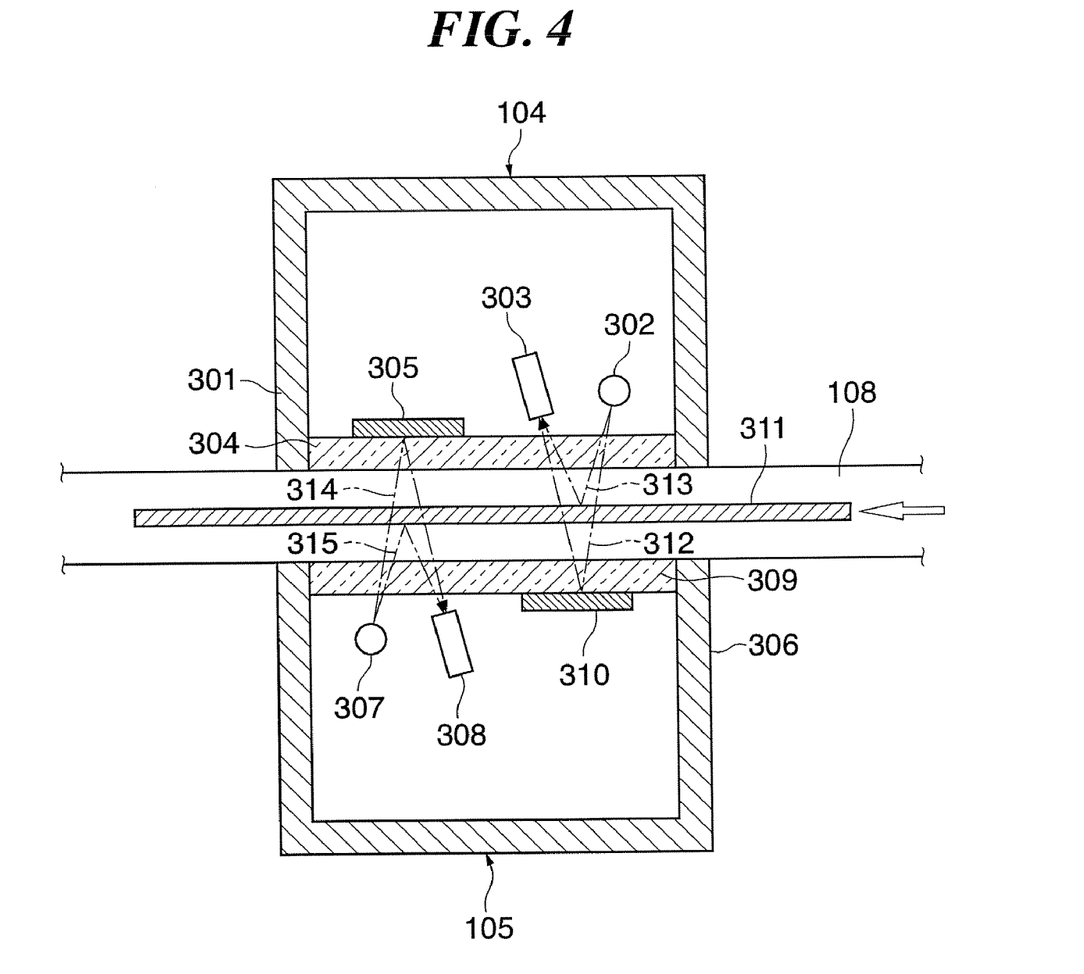
FIG. 4 is a cross-sectional view of configurations of image reading units in FIG. 2.

FIG. 4 is a cross-sectional view of the configurations of the image reading units 104 and 105 of FIG. 2.

In FIG. 4, the image reading unit 104 is comprised of a frame 301 having a substantially U-shaped cross section that is arranged along the main scanning direction, and a contact glass 304 that is fixed to the frame 301. The image reading unit 104 is further comprised of a lamp 302 that illuminates an original moving through the conveying path 108 within the unit, a line image sensor 303 that receives reflection light from the original and converts the received reflection light to a voltage to output an output signal, and a shading reference plate 305 that serves as a background member opposing the image reading unit 105 for reading of the other side of the original. The shading reference plate 305 is arranged inside the image reading unit 104 opposing the image reading unit 105, and thus, stain or damage of the shading reference plate 305 can be effectively prevented.

The image reading unit 105 is comprised of, within the unit, a lamp 307 that illuminates an original moving through the conveying path 108, a line image sensor 308 that receives reflection light from the original, convert the received reflection light to a voltage, and output an output signal, and a shading reference plate 310 that serves as a background member opposing the image reading unit 104 for reading of one side of the original. The shading reference plate 310 is arranged inside the image reading unit 105 opposing the image reading unit 104, and thus, stain or damage of the shading reference plate 310 can be effectively prevented. The line image sensors 303 and 308 are image pickup devices which are constituted of light receiving elements arranged in a row in the main scanning direction, respectively.

Before feeding the original 101 to the conveying path 108, the image reading apparatus 1 illuminates the shading reference plate 310 with the lamp 302 to cause reflection light to enter the line image sensor 303 through a light path 312 and illuminates the shading reference plate 305 with the lamp 307 to cause reflection light to enter the line image sensor 308 through a light path 314. At the same time with illuminating the shading reference plates, the image reading apparatus 1 drives the line image sensors 303 and 308 to read the shading reference plates 310 and 305, thereby acquiring reference plate read data immediately before reading the original and then storing the data in the RAM 203. The CPU 201 multiplies the stored reference plate read data by light intensity distribution correction coefficients described below to generate shading correction data. One feature of the present invention is that a shading reference plate for the image reading unit is arranged inside of the other image reading unit opposing the image reading unit, and even when the distance to the shading reference plate became farther than the distance to original reading position, accurate shading correction data can be generated by correcting the decrease or unevenness occurred to the reference plate read data using the following method. On the other hand, even when the shading reference plate is placed closer than the original reading position, accurate shading correction data can be generated because the resulting increase or unevenness of the reference plate read data can be corrected using same method.

After driving the feed roller 106, once the registration sensor 109 detects the front edge of the original, the image reading unit 104 lights the lamps 302 and 307 and operates the line image sensors 303 and 308 to read an image of original. The CPU 201 performs a shading correction process to the read image data of the original using the shading correction data. The CPU 201 further executes known image processing such as gamma correction, edge enhancement, compression, and the like and transmits the image data after the processing to the host computer 2.

The light intensity distribution correction coefficient generating process will now be described with reference to FIGS. 4 to 6.

In FIG. 4, the light paths 312 and 314 refer to the light paths of when illuminating the shading reference plates 305 and 310 by the lamps 307 and 302, as described above. Although it is preferred that the shading reference plates 305 and 310 are fixed on the inner surfaces of the contact glasses 304 and 309 respectively, but this is not limitative. They may be arranged on arbitrary positions within each image reading unit. The light paths 313 and 315 refer to the light paths when the reference sheet 311 set at the same position as the conveying position of the conveyed original is illuminated by the lamps 302 and 307.

It is preferred that the lamps 302 and 307 comprise light guide members that guide the lamplight to each line image sensor across the entire reading widths of the line image sensors 303 and 308 and also comprise LEDs that enters the lamplight from the ends of the light guide members, but this is not limitative.

The length of the light path 312 is different from that of the light path 313, and therefore, accurate shading correction data cannot be generated when only the reference plate read data is used which is generated from the reflection light from the shading reference plate 310. Similarly, the length of the light path 314 is different from that of the light path 315, and therefore, accurate shading correction data cannot be generated when only the reference plate read data is used which is generated from the reflection light from the shading reference plate 305. Thus, in the present embodiment, the shading reference plates 305 and 310 are first read to acquire the reference plate read data (secondary reference data). The reference sheet 311 is then set at substantially the same position as the conveying position of the original on the conveying path so that it is located between the image reading units 104 and 105, and the line image sensors 303 and 308 are driven to read the reference sheet 311 to thereby acquire the reference sheet read data (primary reference data). Then, filtering for removing noise are performed on the reference sheet read data and the reference plate read data to acquire primary correction data and secondary correction data. And then, the ratio of the primary correction data to the secondary correction data is calculated.

Figure 5:
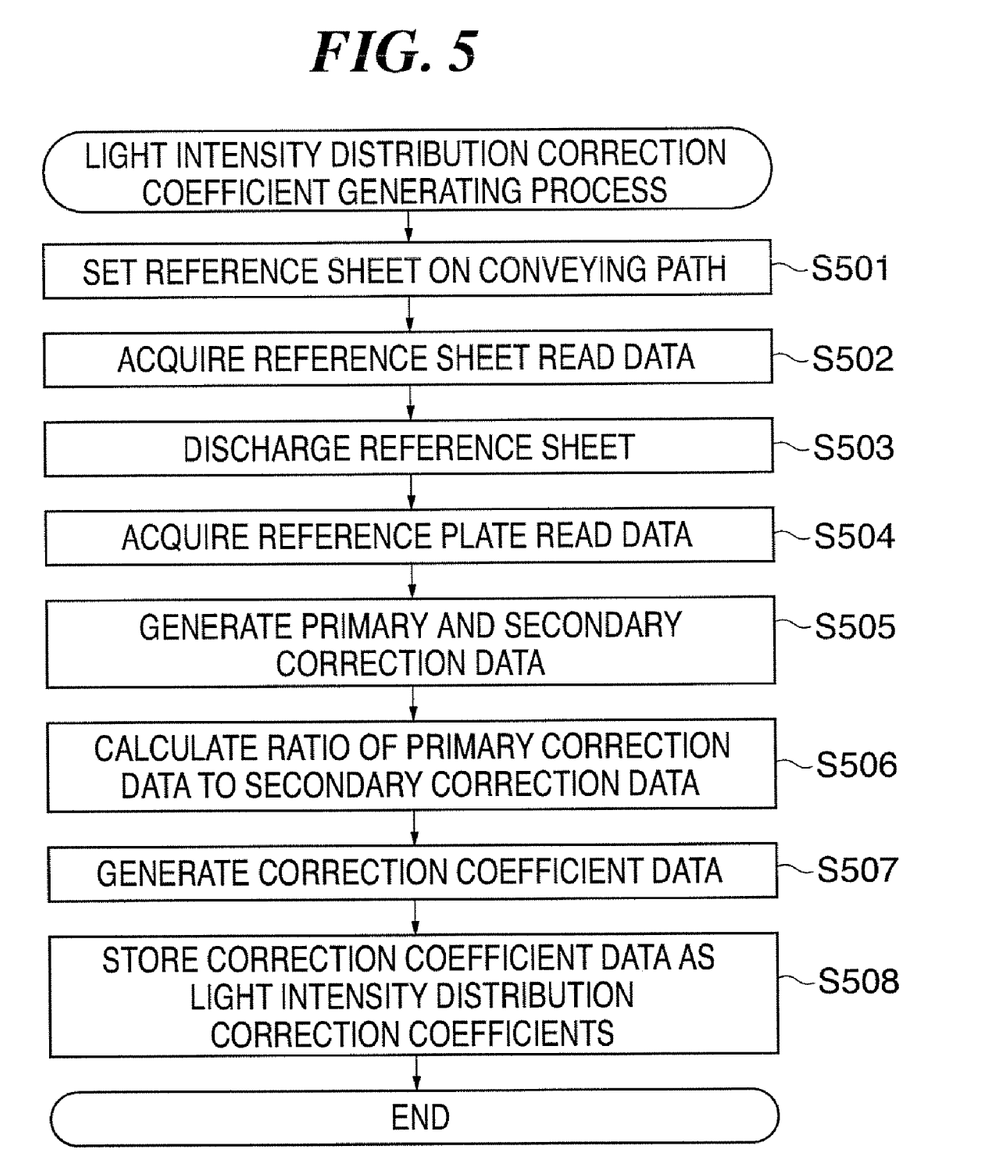
FIG. 5 is a flow chart of a light intensity distribution correction coefficient generating process executed by the CPU in FIG. 3.

FIG. 5 is a flow chart of a light intensity distribution correction coefficient generating process executed by the CPU 201 in FIG. 3. The image reading units 104 and 105 have the same configurations, and therefore, only the light intensity distribution correction coefficient generating process performed using the image reading unit 104 will be described below.

In FIG. 5, once the request of setting the reference sheet 311 is informed to the user using a display panel of the host computer 2 or the like, the reference sheet is conveyed into the conveying path 108 in response to an input operation inputted by the user using keyboard or other input device, and the reference sheet is set on the conveying path positioned between the image reading units 104 and 105 (step S501). When the registration sensor 109 detects the reference sheet or the user inputs an operation, the line image sensor 303 and the lamp 302 are driven to read the reference sheet 311 to thereby acquire the reference sheet read data (step S502). The reference sheet set on the conveying path is then discharged (step S503). The reference sheet may be discharged to the discharge tray 103, for example, by driving the convey rollers 107a to 107f. Differently a request message of removing the reference sheet 311 on the conveying path may be informed to the user using the display panel of the host computer 2. Instead of conveying the reference sheet, a mechanism for projecting a reference member into the conveying path and retracting it from the conveying path may be implemented. The reference sheet does not have to be set completely at the same position as the conveying position of the original, and instead, it can be set at the position near the conveying position of the original where the optical distance is substantially the same.

Once the reference sheet 311 is discharged from the conveying path 108, the line image sensor 303 and the lamp 302 are driven to read the shading reference plate 310 to thereby acquire the reference plate read data (step S504). The neighborhood averaging process namely the low-pass filtering process is performed to the reference plate read data obtained at step S504 and the reference sheet read data obtained at step S502 to generate primary correction data and secondary correction data (step S505). It is preferred that the mask size of the low-pass filtering process (first filtering process or second filtering process) is the smallest size that can remove noise resulted from the variation in sensitivity of the light receiving elements of the line image sensor 303.

Subsequently, the ratio data which indicates a ratio of the primary correction data to the secondary correction data is calculated using the equation (1) below (step S506).

$$\text{(ratio data)}=\text{(primary correction data)}/\text{(secondary correction data)} \quad (1)$$

Low-pass filtering process (third filtering process) using a mask size independent from the mask size of the first and second low-pass filtering process executed in step S505 is performed to the ratio data calculated in step S506 to generate correction coefficient data (step S507). The reason that the third filtering process is performed is that the ratio data calculated in step S506 includes noise caused by fine dust or the like attached to contact glass or the like of the line image sensor 303 and noise resulted from the shape of lens, uneven light source, or the like (see FIG. 9) that could not be removed by the low-pass filtering process of the step S505. In addition, if the output light from the light source is a parallel light having uniform directivity, the unevenness caused by directivity will not occur. However, generation of the parallel light having uniform directivity is difficult in an optical system in which light of the point light source such as LED is magnified and illuminates over the entire line image sensor using a magnifying optical system, a light guide, or the like. Therefore, in some cases, the calculated ratio data contains information of uneven directivity specific to the light source.

Figure 6A:
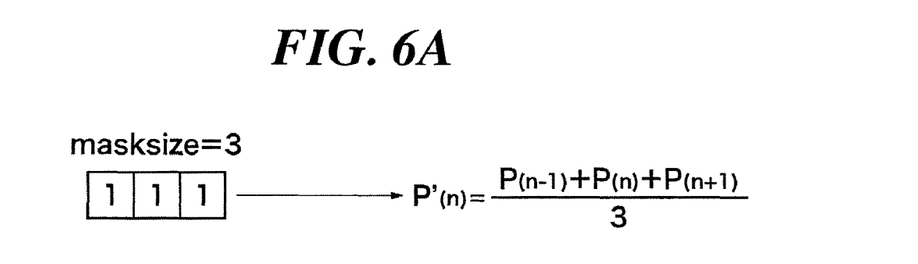
FIG. 6A is a view for explaining a filtering mask used in the correction coefficient data generating process when the mask size is set to 3 in step S507.
Figure 6B:
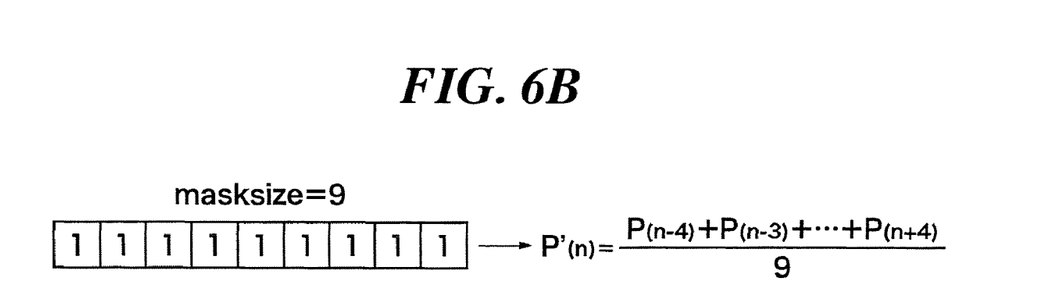
FIG. 6B is a view for explaining a filtering mask used in the correction coefficient data generating process when the mask size is set to 9 in step S507.

FIG. 6A is a view for explaining the filtering of the correction coefficient data generating process when the mask size is set to 3 in step S507. FIG. 6B is a view for explaining the filtering of the correction coefficient data generating process when the mask size is set to 9 in step S507. FIG. 6A illustrates a low-pass filtering process as one example of a simple noise removing process in which the mask size is set to 3 and the average of data of three pixels is calculated with all the filter coefficients being 1. FIG. 6B illustrates a low-pass filtering process as one example of simple noise removing process in which the mask size is set to 9 and the average of nine pixels is calculated with all the filter coefficients being 1.

Figure 7A:
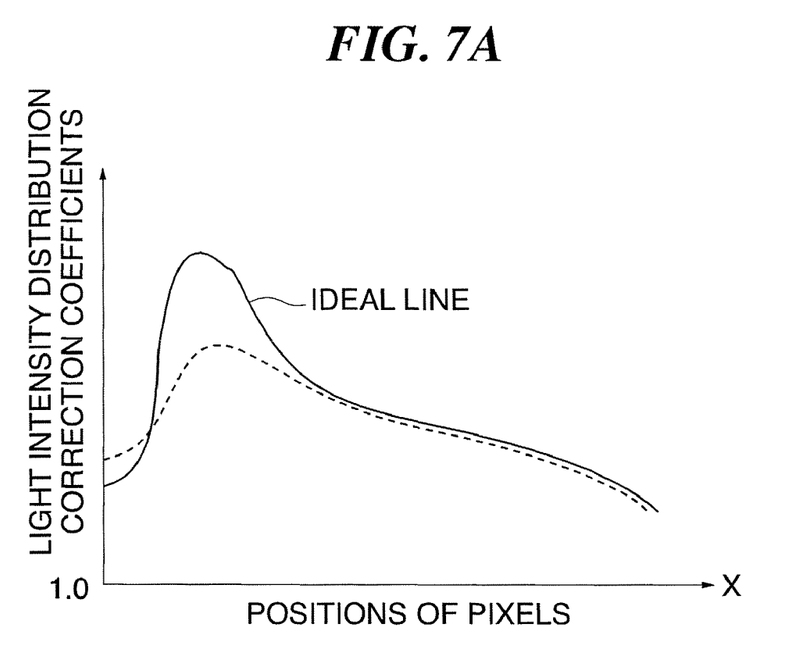
FIG. 7A is a view showing the case where the ratios calculated in step S506 are averaged with a large mask size.
Figure 7B:
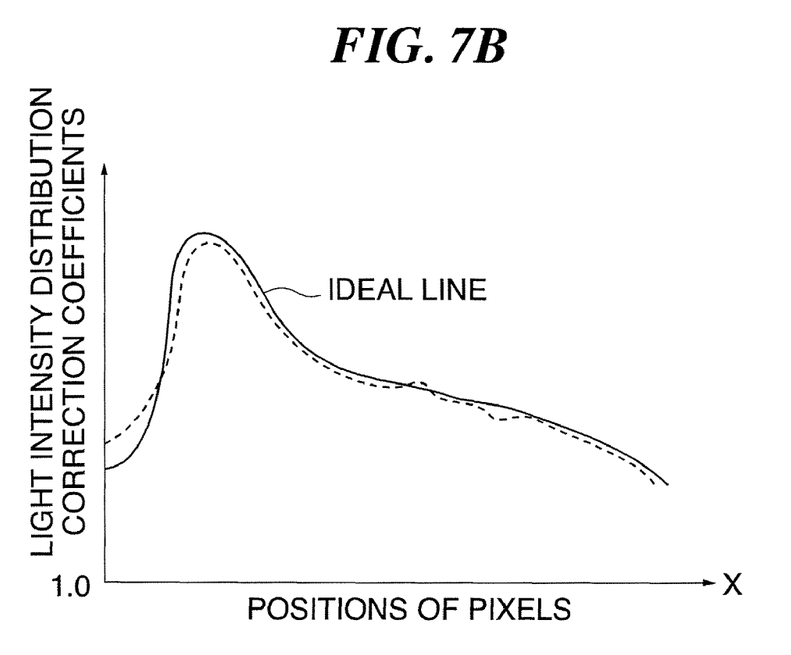
FIG. 7B is a view showing the case where the ratios calculated in step S506 are averaged with a small mask size.
Figure 8:
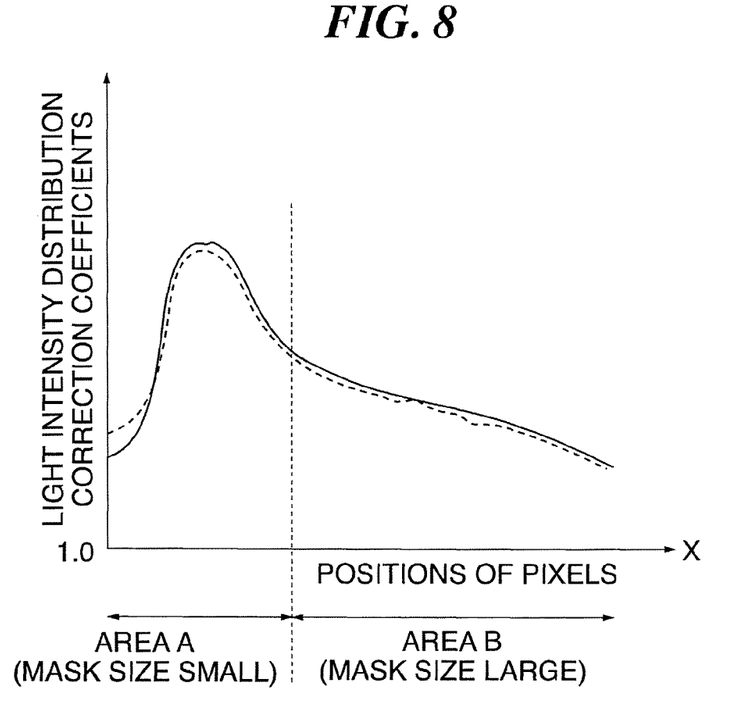
FIG. 8 is a view for explaining a low-pass filter used in the low-pass filtering process in step S507.

In general, a low-pass filtering process is performed to remove relatively abruptly changing noise. A larger mask size makes the passband of the low-pass filter narrower, thereby enhancing the advantage. Thus, if the ratio data calculated in step S506 is averaged with a large mask size to remove more noise, even the gradually changing uneven directivity required in the shading correction is removed, causing a large deviation from the ideal line (dotted line in FIG. 7A). On the other hand, if the ratio data is averaged with a small mask size, noise that should be removed remains, such as noise caused by stain on the shading reference plate or noise caused by the wrinkle of the reference sheet (dotted line of FIG. 7B). Therefore, as shown in FIG. 8, in the low-pass filtering process of step S507, the passband varies in accordance with the positions of the light receiving elements corresponding to the positions of the pixels of the ratio data calculated in step S506. Specifically, the processing areas corresponding to the positions of the pixels of the line image sensor are divided into an area A where the unevenness caused by directivity has emerged and an area B where only the noise caused by stain of the shading plate or noise caused by the fracture of the reference sheet has emerged. A small mask size is used for the filtering of the area A, while a mask size larger than the mask size used in the area A is used for the filtering of the area B. For area A in which a noise caused by fine dust or the like also emerged, noise removing capability of the filtering is weaker, because the data in area A where the unevenness caused by directivity has emerged must be averaged with a small mask size. However, a result (dotted line of FIG. 8) closer to the ideal line than when averaging with a large mask size can be obtained. Subsequently, filtered ratio data (correction coefficient data) obtained by performing the low-pass filtering process to the ratio data is stored in the RAM 203 as light intensity distribution correction coefficients (step S508), and the process is terminated. The unevenness caused by directivity emerged in a specific area such as the area A is particularly evident near the end of the light guide member in the image reading apparatus in which the light is guided throughout the entire line image sensor using the light guide member.

The CPU 201 multiplies, as shown by equation (2) below, the data of each pixel included in the read data of the shading reference plate 310 obtained immediately before the scan operation by the light intensity distribution correction coefficients generated by the light intensity distribution correction coefficient generating process of FIG. 5 to thereby generate shading correction data for use in scanning.

$$\text{(shading correction data)} = \text{(shading reference plate read data immediately before scanning)} \times \text{(light intensity distribution correction coefficients)} \quad (2)$$

The shading correction data thus calculated is used for implementing a usual shading correction method to the image data obtained by the actual scan operation. Assuming the image data prior to the shading correction as image data before correction, and assuming the white level obtained by the shading correction as a target value, output image data is calculated by the following equation (3).

$$\text{(output image data)} = \text{(image data before correction)} \times \text{(target value)}/\text{(shading correction data)} \quad (3)$$

Since the unevenness caused by directivity are dependent on the arrangement of the optical system, substantially the same unevenness emerges on image reading apparatuses having the same optical system configuration. Therefore, the mask size, the mask coefficient, and the position of the pixel for changing the mask size that are used in the third filtering can be the same values. The existence of the unevenness caused by directivity or the noise caused by stain or the like may be determined based on the distribution profile of the ratio of the primary correction data to the secondary correction data or based on the value of the ratio. And automatic change of the mask size, the mask coefficient, and the position of the pixel for changing the mask size to thereby change the passband of the low-pass filter can be executed.

According to the present embodiment, the read data of the reference sheet 311 and the shading reference plate 310 read by the image reading unit 104 is acquired as primary reference data and secondary reference data. And primary correction data and secondary correction data are generated based on the primary and secondary reference data. Then correction coefficient data is generated based on the primary and secondary correction data. Furthermore, shading correction data is generated based on the read data in which the shading reference plate 310 is read immediately before image reading and correction coefficient data, and the shading correction of the image of original read by the image reading unit 104 is performed based on the shading correction data. This enables to remove the noise caused by stain on the contact glass 309, stain on the shading reference plate 310, or the like. However the removal of the unevenness caused by directivity of the lamp 303 required for the shading correction is prevented. Therefore make it possible to generate accurate shading correction data while removing the noise. Furthermore, the shading reference plate 310 is arranged in the opposing image reading unit 105, and thus, the stain or damage of the shading reference plate 310 can be effectively prevented.

In the present embodiment, the region of data to be filtered is divided into region A and region B in association with the positions of the light receiving elements of the line image sensor to perform different low-pass filtering process respectively. However this is not limitative. The region of data may be divided into three or more regions for performing different low-pass filtering respectively. Furthermore, although the mask size is changed in two stages (3 and 9) in the present embodiment, this is not limitative, but it may be changed in three or more stages.

Differ from the present embodiment, the filter coefficients may be changed to change the passband of the low-pass filter without changing the mask size.

In the present embodiment, the image reading apparatus 1 is comprised of the image reading unit 104 and the image reading unit 105 for double-side reading. However the image reading apparatus 1 may only have the image reading unit 104. In this case, in place of the image reading unit 105, for example, the image reading apparatus is provided with a transparent member such as a glass plate opposing the image reading unit 104, and a shading reference plate opposing the image reading unit and being disposed on the back face that is not facing the conveying path of the transparent member.

A part or all of the above described various processes in relation to the shading correction process of the present invention may also be accomplished by a hardware circuit. It is to be understood that the object of the present invention may also be accomplished by supplying an image reading apparatus with a storage medium in which a program of software which realizes the functions of the above described embodiment is stored, and causing a computer (or CPU or MPU) of the image reading apparatus to read and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, a magnetic-optical disk, an optical disk such as a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-049583, filed Feb. 28, 2007, which is hereby incorporated by reference herein in its entirety.

What is claimed is:

1. An image reading apparatus comprising:
   an image reading unit including a light source for illuminating an original and an image sensor adapted to read images of the original at a predetermined original reading position;
   a first reference member arranged at a first position having a first optical distance between the first position and the image sensor that is different from a second optical distance between the original reading position and the image sensor;
   a reference data acquiring unit adapted to acquire first reference data based on data read from the first reference member by the image reading unit, and adapted to acquire second reference data based on data read from a second reference member positioned at the original reading position or a position substantially identical to the original reading position by the image reading unit;

a correction data generating unit adapted to generate first correction data based on the first reference data and adapted to generate second correction data based on the second reference data;

a shading correction data generating unit adapted to generate shading correction data referring to the first reference member, and based on the first correction data and the second correction data; and a shading correction unit adapted to perform a shading correction of the images of the original read by the image reading unit based on the shading correction data generated by the shading correction data generating unit, wherein the shading correction data generating unit performs shading correction data generation processing in which a compensation is applied to data which is based on data read from the first reference member using the first and second correction data generated from the first and second reference members, and wherein the compensation is applied in consideration of a difference of light intensity distribution resulting from a difference between the original reading position and the first position of the first reference member.

2. An image reading apparatus as claimed in claim 1, wherein the shading correction data generating unit includes a first filtering unit adapted to perform first filtering to the primary reference data and a second filtering unit adapted to perform second filtering to the secondary reference data.

3. An image reading apparatus as claimed in claim 2, wherein the first filtering unit performs low-pass filtering to the primary reference data, and the secondary filtering unit performs low-pass filtering to the secondary reference data.

4. An image reading apparatus as claimed in claim 2, wherein the correction coefficient data generating unit calculates data ratio of the primary correction data to the secondary correction data and then performs third filtering.

5. An image reading apparatus as claimed in claim 4, wherein the first filtering, the second filtering, and the third filtering are low-pass filtering process.

6. An image reading apparatus as claimed in claim 4, wherein the image sensor is constituted of light receiving elements arranged in a row into main scanning direction, and the third filtering is low pass filtering process whose passband on each pixel of the data ratio is determined depending on the position of the light receiving element corresponding to the position of the pixel.

7. An image reading apparatus as claimed in claim 5, wherein the image sensor is constituted of light receiving elements arranged in a row along a main scanning direction, and the third filtering is low pass filtering process whose passband on each pixel of the data ratio is determined depending on the position of the light receiving element corresponding to the position of the pixel.

8. A shading correction data generating method of generating shading correction data used for shading correction of images of an original read by an image reading unit including a light source for illuminating the original and an image sensor adapted to read the images of the original at a predetermined original reading position, the shading correction data generating method comprising:

a first reference data acquiring step of acquiring first reference data based on data read by the image reading unit from a first reference member arranged at a first position having a first optical distance between the first position and the image sensor that is different from a second optical distance between the original reading position and the image sensor;

a second reference data acquiring step of acquiring second reference data based on data read by the image reading unit from second reference member when said second reference member is positioned at the original reading position or a position substantially identical to the original reading position;

a correction data generating step of generating second correction data based on the second reference data, and adapted to generate first correction data based on the first reference data; and a shading correction data generating step of generating shading correction data referring to said first reference member, and based on the first and second correction data, wherein the shading correction data generating method comprises shading correction data generation processing in which generation processing of the shading correction data is performed, by applying a compensation to data which is based on data read from the first reference member using the first and second correction data generated from the first and second reference members;

wherein the compensation applied is based on data read from the first reference member, considering a difference of light intensity distribution resulting from a difference between the original reading position and the first position of the first reference member.

9. An image reading apparatus comprising;

an image reading unit including a light source for illuminating an original and an image sensor adapted to read images of the original at a predetermined original reading position;

a first reference member which is arranged at a location, where a first optical distance between a position of the first reference member and a position of the image sensor differs from a second optical distance between the original reading position and the position of the image sensor;

a reference data acquiring unit adapted to acquire a reference data for shading correction referring to the first reference member;

a shading correction data generating unit adapted to generate a shading correction data from the reference data acquired by the reference data acquiring unit, wherein the image reading apparatus further comprises a unit adapted to enable a second reference member to be positioned at the original reading position or at a position substantially identical to the original reading position, the second reference member being different from the first reference member; and the shading correction data generating unit generates the shading correction data, by correcting data which is based on the reference data acquired by the reference data acquiring unit, wherein the correcting including applying a compensation using data read by the image reading unit from the second reference member located at the original reading position or at a position substantially identical to the original reading position.

10. An image reading apparatus as claimed in claim 9, wherein the image reading apparatus includes a filtering unit adapted to perform low pass filtering process to the reference data.

11. An image reading apparatus as claimed in claim 10, wherein the image sensor is constituted of light receiving elements arranged in a row into a main scanning direction, and the low pass filtering process has passbands, wherein each of the passbands is determined depending on the position of the light receiving element corresponding to the position of each pixel of read data.

12. A shading correction data generating method of generating shading correction data used for shading correction of images of an original read by an image reading apparatus wherein the image reading apparatus comprises:

an image reading unit including a light source for illuminating the original and an image sensor adapted to read the images of the original at a predetermined original reading position; and a first reference member which is arranged at a first position, where a first optical distance between the first position of the first reference member and a position of the image sensor differs from a second optical distance between the original reading position and the position of the image sensor, wherein the image reading apparatus further comprises a unit adapted to enable a second reference member to be positioned at the original reading position or at a position substantially identical to the original reading position, and wherein the second reference member is different from the first reference member;

the shading correction data generating method comprising:

a reference data acquiring step of acquiring reference data for shading correction referring to the first reference member;

a shading correction data generating step of generating shading correction data, by correcting data, which is based on the reference data acquired upon the reference data acquiring step, wherein the correcting includes applying a compensation to the data using data read by the image reading unit, from the second reference member positioned at the original reading position or at a position substantially identical to the original reading position.

* * * * *